United States Patent
Jain et al.

(10) Patent No.: US 10,157,137 B1
(45) Date of Patent: Dec. 18, 2018

(54) CACHE WAY PREDICTION

(71) Applicant: Apple Inc., Cupertino, CA (US)

(72) Inventors: Prashant Jain, San Jose, CA (US); Jason M. Kassoff, Denver, CO (US); Sandeep Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 373 days.

(21) Appl. No.: 14/861,470

(22) Filed: Sep. 22, 2015

(51) Int. Cl.
*G06F 12/08* (2016.01)
*G06F 12/0864* (2016.01)
*G06F 3/06* (2006.01)

(52) U.S. Cl.
CPC .......... *G06F 12/0864* (2013.01); *G06F 3/061* (2013.01); *G06F 3/0604* (2013.01); *G06F 3/064* (2013.01); *G06F 3/0683* (2013.01); *G06F 2212/1016* (2013.01); *G06F 2212/6032* (2013.04)

(58) Field of Classification Search
CPC ............... G06F 12/0864; G06F 9/3806; G06F 12/0862; G06F 2212/1021; G06F 2212/6082; G06F 2212/6032
See application file for complete search history.

(56) References Cited

U.S. PATENT DOCUMENTS

| 8,180,965 | B2 | 5/2012 | Lu |
| 2004/0030838 | A1* | 2/2004 | van de Waerdt ... G06F 12/0864 711/137 |
| 2009/0094435 | A1 | 4/2009 | Lu |
| 2014/0201449 | A1 | 7/2014 | Sassone et al. |
| 2014/0372696 | A1 | 12/2014 | Tune et al. |
| 2015/0121050 | A1 | 4/2015 | Williams et al. |
| 2017/0060750 | A1* | 3/2017 | Krishna .............. G06F 12/0895 |

* cited by examiner

*Primary Examiner* — Reginald G Bragdon
*Assistant Examiner* — Thanh D Vo
(74) *Attorney, Agent, or Firm* — Meyertons, Hood, Kivlin, Kowert & Goetzel, P.C.

(57) ABSTRACT

Techniques are disclosed relating to set-associative caches in processors. In one embodiment, an integrated circuit is disclosed that includes a set-associative cache configured to receive a request for a data block stored in one of a plurality of ways within the cache, the request specifying an address, a portion of which is a tag value. In such an embodiment, the integrated circuit includes a way prediction circuit configured to predict, based on the tag value, a way in which the requested data block is stored. The integrated circuit further includes a tag array circuit configured to perform a comparison of a portion of the tag value with a set of previously stored tag portions corresponding to the plurality of ways. The tag array circuit is further configured to determine whether the request hits in the cache based on the predicted way and an output of the comparison.

16 Claims, 6 Drawing Sheets

CACHE WAY PREDICTION

BACKGROUND

Technical Field

This disclosure relates generally to processors, and, more specifically, to set-associative caches within processors.

Description of the Related Art

Many processors use a set-associative caching scheme in which a cache may store a data block associated with a given address in one of multiple entries, but not all entries within the cache. More specifically, the entries in a set-associative cache may be grouped into sets—e.g., sets of twelve entries. When a request is received to store a data block at a particular address, a portion of the address (called an "index value" or simply an "index") may be used to select a particular set of entries for storing the data block. The data block may then be stored in any entry within the selected set—e.g., within any one of the twelve entries in the selected set. The particular entry/location in which a set-associative cache stores a data block may be referred to as a "way" in which the data is stored. For example, in a twelve-way set-associative cache, a data block may be stored in one of twelve ways (i.e., in one of twelve cache entries) selected based on a given address index.

Since a data block can be stored in one of multiple ways and multiple addresses may have the same address index, another portion of the address (called a "tag value" or simply a "tag") is typically stored with the data block in order to subsequently determine whether a stored data block is the same data block being requested by a data request. For example, in a twelve-way cache, twelve tags may be stored for a give set—i.e., one for each data block stored in the twelve ways of the set. Accordingly, when a data request is received that specifies an address for a desired data block, the tag in this address is compared with tags stored in the cache that correspond to the various ways in which the data block can be stored. If a match is found, the data block stored in the particular way associated with the matching tag is provided in response to the request. For example, in a twelve-way cache, a given data request may result in twelve tag comparisons. If the tag of the data request matches the tag for the data block stored in the eighth way, the data block stored in the eighth way may be provided in response to the request.

SUMMARY

The present disclosure describes embodiments in which a way prediction circuit is used to predict a way in which data may be stored in a set-associative cache. In various embodiments, the way prediction circuit is configured to provide the predicted way to a data array configured to store data for the cache. In such an embodiment, the data array is configured to initiate retrieval of data stored in the predicted way while a tag circuit of the cache determines the actual way in which the requested data is stored. If the actual way and the predicted way end up differing, the data array may be configured to discontinue retrieval of the data stored in the predicted way in order to prevent incorrect data from being provided in response to a data request.

In some embodiments, the way prediction circuit is configured to provide the predicted way to the tag circuit to assist the tag circuit in determining the actual way (and more generally, whether the data request even hits in the cache). In one embodiment, the tag circuit is configured to determine the actual way by performing a comparison of tag portions corresponding to the different ways in which the requested data may be stored. If a match is detected, the tag circuit may then compare the way corresponding to the matching tag with the received predicted way. If this comparison results in a match, in one embodiment, the tag circuit is configured to indicate that the matching way (i.e., the predicted way) is the actual way in which the requested data is stored.

In some embodiments, the way prediction circuit is configured to determine the predicted way by applying a hash function to a received tag and comparing the hashed tag (i.e., the hash value produced from the hash function) with stored hashed tags associated with data stored in the ways in which the requested data may have been stored. If a match is detected, in such an embodiment, the way prediction circuit is configured to identify the way associated with the matching, stored tag as the predicted way.

Figure 1:
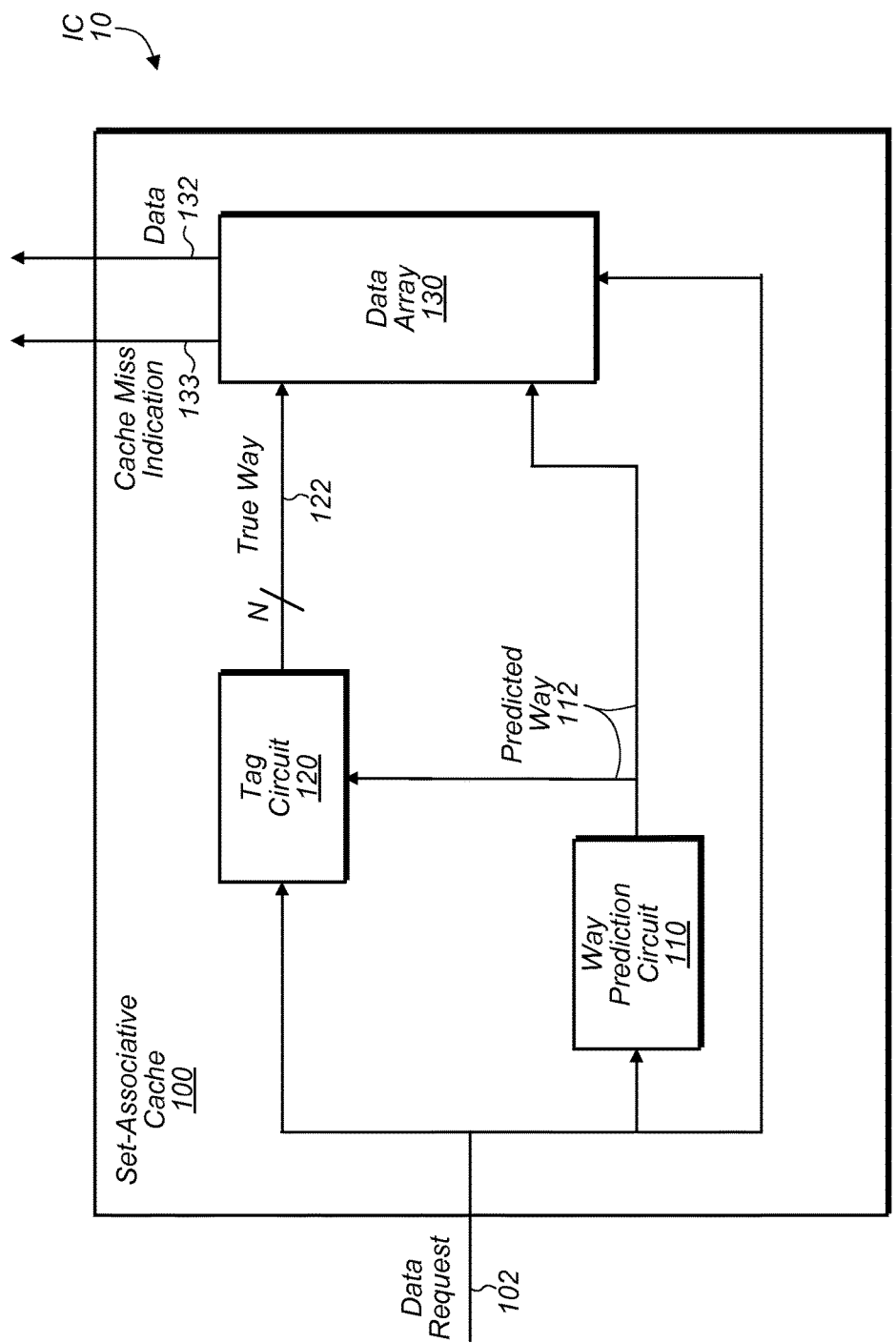
FIG. 1 is a block diagram illustrating one embodiment of an integrated circuit that includes a set-associative cache having a way prediction unit.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "set-associative cache configured to receive a request for a data block" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, the terms "first" and "second" may be used to describe portions of tags. The phrase "first portion" of a tag is not limited to only the high-order bits of the tag, for example.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

When caches implement a large number of ways, it can take multiple cycles for a cache to determine whether a requested data block is present in the cache and determine the way in which the data block was stored. For example, in a twelve-way cache, it may take multiple cycles to perform a given tag comparison. The cache may also be configured to perform only a subset of the tag comparisons at a given time (e.g., four of the twelve comparisons at a given time).

The present disclosure describes embodiments in which a way prediction circuit is configured to predict the way in which a block of data is stored in a cache, and to indicate the predicted way to the cache to cause the cache to begin retrieving a data block stored in the predicted way. As used herein, the phrase "predicted way" refers to the output of a way prediction circuit and indicates one of the possible ways in the cache and may also indicate that the requested is not stored in the cache at all. By its nature, the predicted way may be inaccurate. This value may thus be thought of as a "guess" by the way prediction circuit. In some embodiments, the inability to definitively predict the way in which a data block is stored may be attributable to the use of hash values, as discussed below, and the potential for hash collisions—i.e., the scenario in which different addresses produce the same hash value. When the predicted way is correct, however, the cache may be able to begin retrieving a data block earlier than if the cache had waited for a tag comparison to complete.

Because a predicted is potentially inaccurate, a tag comparison may still be warranted to confirm that the predicted way is accurate. As will be described below, in various embodiments, the way prediction circuit is configured to determine a predicted way in which data is stored for a given address, and to assist in determining the actual way in which data is stored. In contrast to "predicted way," the phrases "actual way" or "true way" refer to the way in which data is actually stored in a cache (or that data is not stored at all in the cache). In various embodiments discussed below, the way prediction circuit is configured to calculate a hash value from a tag value included in a given address and to compare the hash value with hash values associated with the ways in which the data may be stored. In such an embodiment, if a match is found, the way prediction circuit identifies the way associated with the match as the predicted way, and provides the predicted way to a tag circuit configured to perform a tag comparison using tag portions.

As used herein, the phrase "tag portion" or "portion of a tag" refers to an amount of a tag that is less than the entirety of the tag. Because a tag portion does not include all of the bits in a tag, a comparison of tag portions is not able to determine the actual way per se. In various embodiments discussed below, however, the tag array is configured to combine the result of the partial tag comparison with the predicted way in order to determine the actual way in which a data is stored. More specifically, the tag array may compare the predicted way with the way associated with a matching tag portion from the partial tag comparison. If the ways match, the tag array is configured to identify the matching ways as the actual way in which the requested data is stored (and more generally that the data request hits in the cache—i.e., the data requested by the data request is stored in the cache). If the ways do not match, however, the tag array is configured to identify that the actual way is none of the ways in the cache (and more generally that the data request misses the cache—i.e., the requested data is not in the cache). In such an event, the cache may be configured to discontinue retrieving data stored in the predicted way. In some embodiments, determining the actual way based on the predicted way allows for a smaller tag array to be used and/or a quicker determination of the actual way to be performed.

Turning now to FIG. 1, a block diagram of one embodiment of an integrated circuit (IC) 10 that includes a set-associative cache 100 is depicted. In the illustrated embodiment, set-associative cache 100 includes a way prediction circuit 110, a tag circuit 120, and a data array 130, which form a cache pipeline configured to service data requests 102 for data stored in cache 100. In some embodiments, cache 100 may include multiple pipelines—i.e., cache 100 may include multiple instances of elements 110, 120, and 130 and be configured to process requests in parallel. In various embodiments, IC 10 includes additional circuitry such as one or more processing cores, a memory management unit (MMU), a graphics processing unit (GPU), and/or other circuitry such as described below with respect to FIG. 6.

Cache 100, in one embodiment, is or is part of an internal memory device configured to store data accessible to other circuitry within IC 10. Accordingly, cache 100 may receive requests 102 to read data stored in data array 130 as well as requests 102 to write data into data array 130. In various embodiments, data requests 102 specifying an address is parsed into portions that are processed in order to facilitate acting on the request as discussed below. In some embodiments, a given address specified by a request 102 is 36-bits, which can be denoted as $B_{35-0}$ with bit 35 being the most significant bit. These 36 bits may be divided to include a tag (e.g., corresponding to $B_{35-19}$), an index (e.g., corresponding to $B_{18-11}$), a bank identifier (e.g., corresponding to $B_{10-9}$), a pipe identifier (e.g., corresponding to $B_{8-7}$), and an offset (e.g., corresponding to $B_{6-0}$). In other embodiments, the address may be arranged differently. In various embodiments, cache 100 is configured to store data using a set-associative-cache scheme. Accordingly, when cache 100 receives a data request 102 to store a data block, cache 100 may decode the address in the data request and determine, based on the decoded address index, a corresponding set of locations in data array 130 that are each able to store the data block. For example, in one embodiment, cache 100 is a 12-way set-associative cache; thus, given a particular address for a data block, cache 100 may store the data block in one of twelve ways (i.e., one of twelve entries in data array 130). Cache 100, however, may support any suitable level of associativity. In some embodiments, cache 100 implements one of multiple cache levels in IC 10—e.g., in one embodiment, cache 100 is a level 2 (L2) cache that is shared by multiple processing cores, which each include a respective level 1 (L1) cache. Cache 100, however, may be associated with any suitable level in a memory hierarchy.

Way prediction circuit 110, in one embodiment, is circuitry including logic configured to predict the way in which requested data is stored in response to receiving a data request 102, which may be a read request to read stored data or a write request to write data. As will be described below with respect to FIG. 2, when a data block is initially written into cache 100, way prediction circuit 110, in various embodiments, is configured to compute a hash value from the address (or more specifically the tag, in one embodiment) associated with the data block. Way prediction circuit 110 may then store the hash value such that it is associated with the way in which the data block was stored. For example, if the data block was stored in the eighth location of a 12-way cache, way prediction circuit 110 may store the hash value such that it is associated with the eighth way. When a request 102 is later received for the data block, in various embodiments, way prediction circuit 110 computes a hash value from the address in the request 102 and compares the hash value with a set of corresponding hash values associated with the possible ways in which the data block was stored. As discussed below, the particular set of hash values may be identified based on an index in the address. In such an embodiment, if a match is detected (e.g., the hash value from the address matches the hash value associated with the eighth way), way prediction circuit 110 is configured to identify the associated way as predicted way 112 (e.g., circuit 110 may indicate that the eighth way is predicted to store the requested data). Alternatively, if the requested data block is not in data array 130, way prediction circuit 110 may indicate that the data was not stored in any of the ways (i.e., the data request has resulted in a cache miss). As shown in illustrated embodiment, way prediction circuit 110 is configured to provide the predicted way 112 to tag circuit 120 and data array 130.

Tag circuit 120, in one embodiment, is circuitry configured to perform a tag comparison in order to determine the true/actual way in which a data block may be stored in data array 130 (and more generally, whether data request 102 hits in cache 100). As will be described below with respect to FIG. 3, in various embodiments, tag circuit 120 is configured to perform a comparison of tag portions (as opposed to entire tags). Accordingly, when a data block is stored in data array 130, tag circuit 120 may store a portion of the tag (e.g., half the tag, in one embodiment) of the data block's address and associate the stored portion with the way in which the data block is stored. In such an embodiment, when a comparison of tag portions is later performed, tag circuit 120 is configured to combine the result of the comparison with the predicted way 112 in order to determine the actual way in which the data block is stored. As shown in the illustrated embodiment, tag circuit 120 is configured to provide the actual/true way 122 to data array 130.

As noted above, data array 130, in one embodiment, is circuitry configured to store data for cache 100. In some embodiments, data array 130 includes static random access memory (SRAM) cells arranged into cache lines each corresponding to a way in which data may be stored; in other embodiments, other types of memory may be used such as dynamic RAM (DRAM). In various embodiments, when data array 130 receives a predicted way 112 associated with a data request 102, data array 130 is configured to begin retrieving a data block stored in the predicted way 112 while tag circuit 120 is determining the true way 122. If the true way 122 and the predicted way 112 are the same, data array 130 is able to more quickly provide the requested data 132 than if no prediction was performed. If, however, the true way 122 differs from the predicted way 112 (i.e., the predicted way is mispredicted), data array 130, in various embodiments, is configured to prevent the retrieval of the data block from completing—i.e., prevent the incorrect data from being provided in response to the data request 102. As will be discussed with respect to FIG. 3, in some embodiments, if the predicted way 112 is mispredicted, cache 100 is configured to invalidate the hashed tag for the predicted way and replay the data request 102 through the cache pipeline—e.g., reprocess the request 102 through circuits 110, 120, and 130. In other embodiments, however, cache 100 may be configured to resolve the misprediction in the same pass through the cache pipeline.

Figure 2:
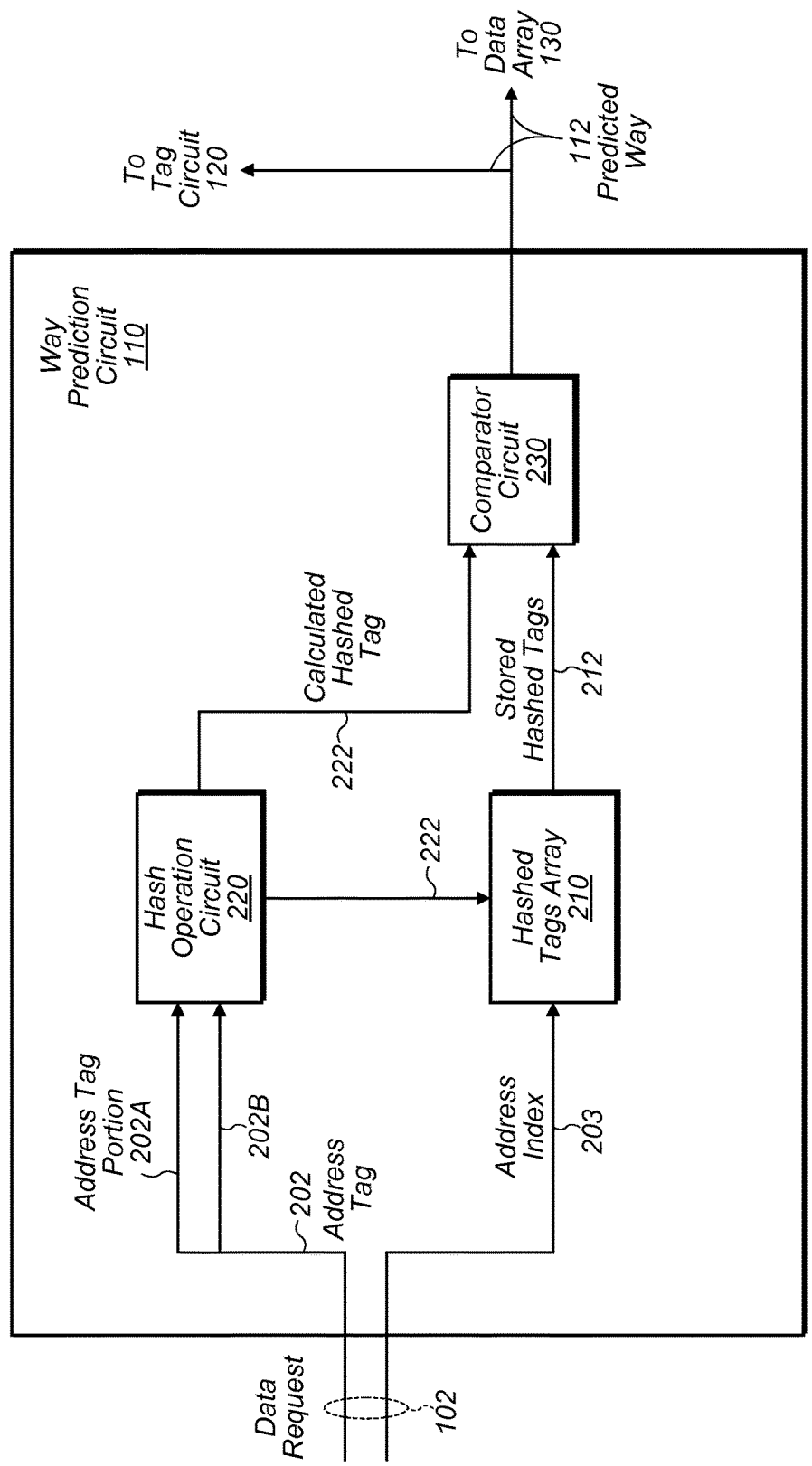
FIG. 2 is a block diagram illustrating one embodiment of the way prediction unit.

Turning now to FIG. 2, a block diagram of one embodiment of way prediction circuit 110 is depicted. As shown, way prediction circuit 110 may include a hashed tags array 210, a hash operation circuit 220, and a comparator circuit 230. As noted above, in various embodiments, way prediction circuit 110 is configured to generated a predicted way 112 based on a received data request 102. Accordingly, in the illustrated embodiment, way prediction circuit 110 is configured to generate a predicted way 112 based on, more specifically, the address tag 202 and address index 203 included in the address specified by the data request 102. In various embodiments, way prediction circuit 110 may be implemented differently than shown.

Hashed tags array 210, in one embodiment, is a memory configured to store hashed tags 212 that correspond to data blocks stored in cache 100 and that are each associated with a way in which a respective data block is stored in cache 100. (As used herein, the term "hashed tag" refers to a hash value that is generated by applying a hash function to a tag.) Accordingly, in various embodiments, when cache 100 stores a new data block in data array 130, hash operation circuit 220 (discussed below) is configured to hash the tag associated with the data block and store the hashed tag in an entry of array 210 that corresponds to the way in which the data block is stored. In some embodiments, array 210 is configured to store a hashed tag for each entry in data array 130. In various embodiments, when cache 100 later receives a data request 102, array 210 is configured to provide a set of hashed tags 212 corresponding to the ways in which the data may have been stored. In the illustrated embodiment, array 210 is configured to identify which set of hashed tags 212 (e.g., which set of twelve tags for a 12-way cache) to provide based on the address index 203 in the address specified in request 102.

In some embodiments, array 210 is also configured to store with each hashed tag 212 a validity indication (e.g., a validity bit) identifying whether that hashed tag 212 is valid. In such an embodiment, upon storing a hashed tag 212, array 210 may set an indication identifying the hashed tag 212 as valid. If the cache entry corresponding to the hashed tag 212 is evicted from cache 100, array 210 may then store indication that the entry is no longer valid. In some embodiments, way prediction circuit 110 is configured to not allow duplicate hashed tags 212 to be a part of the same set. In such an embodiment, if array 210 is attempting to store a hashed tag 212 and detects that the same hashed tag is already present in a given set of hashed tags 212, array 210 is configured to invalidate the previously stored hashed tag 212 (e.g., by clearing the validity bit). In doing so, comparator circuit 230 is prevented from identifying multiple matches for a given calculated hashed tag 222—i.e., comparator circuit 230 may identify only one match for a given hashed tag 222.

Hash operation circuit 220, in one embodiment, is configured to compute a calculated hashed tag 222 from a received address tag 202. Accordingly, circuit 220 is configured to apply a hash function to address tag 202 in order to generate a corresponding hash value from the tag 202 (i.e., a hashed tag 222). In the illustrated embodiment, hash operation circuit 220 is configured to calculate a hashed tag 222 by splitting address tag 202 into two portions 202A and 202B and performing an exclusive-OR (XOR) operation between the portions 202A and 202B. For example, portion 202A may correspond to the higher-order half of the tag 202 and portion 202B may correspond to the lower-order half of the tag 202. Circuit 220 may then pass these portions through XOR gates included in circuit 220 to produce a calculated hashed tag 222. In other embodiments, however, hash operation 220 may be configured to perform other suitable operations such as modulo arithmetic, cyclic redundancy check (CRC) generation, a logical AND, etc.

Comparator circuit 230 is configured to compare a calculated hashed tag 222 and stored hashed tags 212. Comparator 230 may perform any suitable logical operations to determine a match. For example, comparator circuit 230 may include logic configured to perform an exclusive-OR operation of hashed tags 212 and 222. If the calculated hashed tag 222 matches one of the stored hashed tags 212, comparator 230, in one embodiment, is configured to identify the way associated with the matching tag 212 as the predicted way 112. In various embodiments, circuit 230 also factors in validity indications when performing comparisons. Accordingly, if a particular hashed tag 212 is indicated as being invalid, circuit 230 is configured such that it will not identify a match for that hashed tag 212 regardless of whether the hashed tag 212 is the same as the calculated hashed tag 222. In doing so, as discussed above, comparator circuit 230 is configured to identify, at most, a single match and provide a single predicted way 112 for a given data request 102. In various embodiments, if circuit 230 does not identify any match, circuit 230 is configured to indicate that the requested data block is not stored in any way in cache 100. That is, comparator circuit 230 may output a predicted way 112 specifying that none of the ways stores the requested data block.

Figure 3:
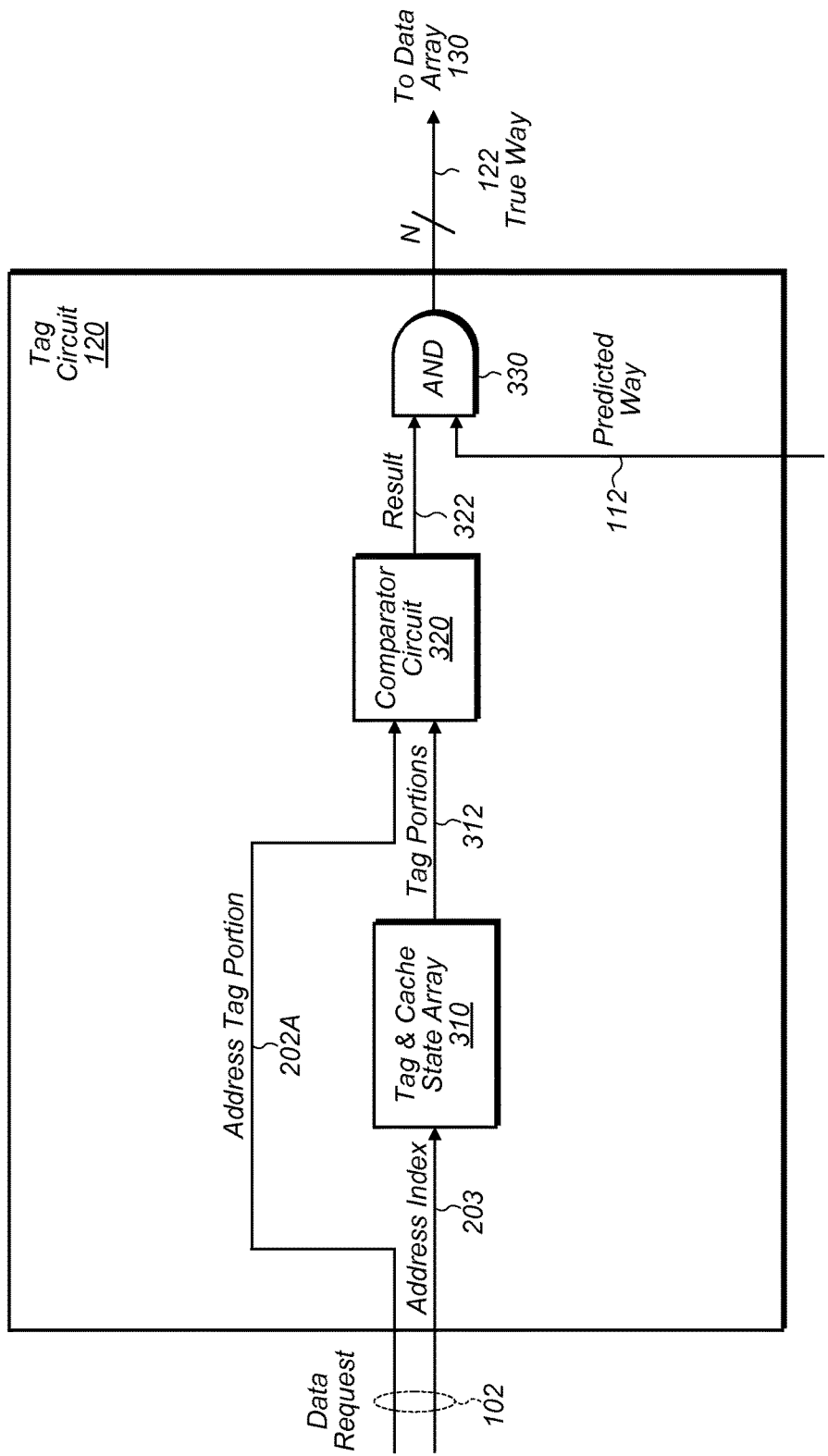
FIG. 3 is a block diagram illustrating one embodiment of a tag unit within the cache.

Turning now to FIG. 3, a block diagram of one embodiment of tag circuit 120 is depicted. As shown, tag circuit 120 may include a tag and cache state array 310, a comparator circuit 320, and an AND gate 330. As noted above, in various embodiments, tag circuit 120 is configured to generate a true/actual way 112 based on a portion of the address tag 202 (e.g., address tag portion 202A, in the illustrated embodiment) and the address index 203 included in the address specified by the data request 102. In various embodiments, tag circuit 120 may be implemented differently than shown.

Tag and cache state array 310, in one embodiment, is configured to store tag portions usable to determine a way in which a data block is stored in cache 100. Accordingly, when cache 100 receives a request to store a data block, array 310 is configured to store a tag portion for the data block in a manner that is associated with the way in which the data block is stored. For example, in a twelve-way cache, if the data block is stored in the eighth way, array 310 may store the tag portion at a location corresponding to the eighth way. When a data request 102 is later received, in various embodiments, array 310 is configured to retrieve the tag portion 312 based on the address index 203 in the address specified by the request 102. In the illustrated embodiment, array 310 is configured to store the upper portion 202A of an address tag (i.e., the higher-order half). In other embodiments, array 310 may store the lower portion 202B or some other portion. In some embodiments, array 310 is configured to store validity information (e.g., a validity bit) associated with each tag portion to indicate whether the tag portion is invalid (i.e. a tag portion is not useable). In some embodiments, array 310 may be implemented in a memory-based storage device.

Comparator 320, in one embodiment, is configured to compare the tag portion 202A specified in data request 102 and a stored tag portions 312 from array 310. Comparator 320 may perform any of the suitable logical operations to determine a match. For example, in one embodiment, comparator 320 includes exclusive-OR (XOR) logic configured to perform an XOR operation of tag portions 202 and 312. In the illustrated embodiment, comparator 320 is configured to output a result 322 of the comparison to AND gate 330. Accordingly, if a match is identified in this embodiment, comparator 320 is configured to output a result 322 identifying the way associated with the matching tag portions 202 and 312. If no match is found, comparator 320 may indicate that none of the ways is associated with a match.

AND gate 330, in one embodiment, is configured to determine the actual/true way 122 in which a data block is stored by comparing the predicted way 112 with the result 322. If a result 322 matches the predicted way 112, gate 330 is configured to identify the way associated with the match as the true way 122. In illustrated embodiment, gate 330 is configured to determine the true way 122 by performing a logical AND operation of the result 322 and the predicted way 112. In such an embodiment, cache 100 using gate 330 is able to determine the true way 122 without performing a full tag comparison (but rather a half tag comparison and a hashed tag comparison) by exploiting a property of XOR—i.e., that a value A can be recovered from the XOR of A and B by performing the XOR of B with the XOR of A and B. That is, consider the formulas A XOR B=C and A' XOR B'=C' where A and B represent halves of a tag of a received data request 102 and A' and B' are half tag portions for a data block stored in cache 100. If a match is detected by comparator circuit 320, the half tag portions 202A and 312 are equal—i.e., A=A'. If a match of the hashed tags is detected by comparator circuit 230, the hashed tags 222 and 212 are equal—i.e., C=C'. By applying the property above, the equations B=C XOR A and B'=C' XOR A can be derived. Using the substitutions for A' and C', the equations become B=C XOR A and B'=C XOR A. Thus, B=B'. In sum, if A=A' and C=C' can be proven, then B=B' can be derived. For this reason, in such an embodiment, tag circuit 120 can avoid performing a full tag comparison and instead use the predicted way 112 and result 322 to derive the true way 122.

In some embodiments, a result 322 and a predicted way 112 may each be provided over an N-wide interconnect where N is the number of ways. Thus, in such an embodiment, a predicted way 112 of the eighth way may be indicated by, for example, driving the eighth line of the interconnect high. In such an embodiment, multiple AND gates 330 may be used (e.g., twelve for a twelve-way cache) to individually perform an AND operation on a particular line associated with a way. For example, if a result 322 and predicted way 112 indicate the eighth way, the AND gate 330 coupled to those lines may indicate a match for the eighth way. In the illustrated embodiment, AND gates 330 may similarly be configured to drive one of N lines high (or low in another embodiment) in response to a match. For example, a match for the eighth way may result in an AND gate 330 driving the eighth line high to indicate the true way 122. In the event that result 322 and predicted way 112 differ (indicating that predicted way 112 is not the actual way), in some embodiments, AND gate 330 is configured to not assert of any of the N lines (e.g., drive any of the N lines high) in order to indicate that the requested data block is not stored in any of the potential ways (i.e., indicate a true way 122 of none/null).

In the event that result 322 and predicted way 112 differ, tag circuit 120 may be configured to perform different actions depending on why they differ. In some embodiments, if they differ because predicted way 112 identifies a particular way (i.e., a data request 102 hits in prediction circuit 110), but result 322 does not identify a way (i.e., the request 102 misses in tag circuit 120), tag circuit 120 may be configured to cause cache 100 to handle request 102 as a cache miss. If they differ because the particular way identified by predicted way 112 differs from the particular way identified by result 322, in some embodiments, tag circuit 120 is configured to send a request (not shown) that way prediction circuit 110 invalidate the corresponding hashed tag 212 in array 210 that caused the incorrect predicted way 112 to be determined; circuit 120 may also send a request to set a valid bit for the hashed tag 222 associated with the particular way identified by result 322. Tag circuit 120 may be configured to then cause cache 100 to replay the data request 102 through its pipeline (e.g., through circuits 110, 120, and 130) to cause retrieval of the correct data 132. If they differ because predicated way 112 does not identify a particular way (i.e., a data request 102 misses in prediction circuit 110), but result 322 does identify a particular way (i.e., the request 102 hits in circuit 120), tag circuit 120 may be configured to send a request to set a valid bit in array 210 for the hashed tag 222 associated with the particular way identified by result 322, and to cause the request 102 to be replayed in the cache pipeline.

Figure 4:
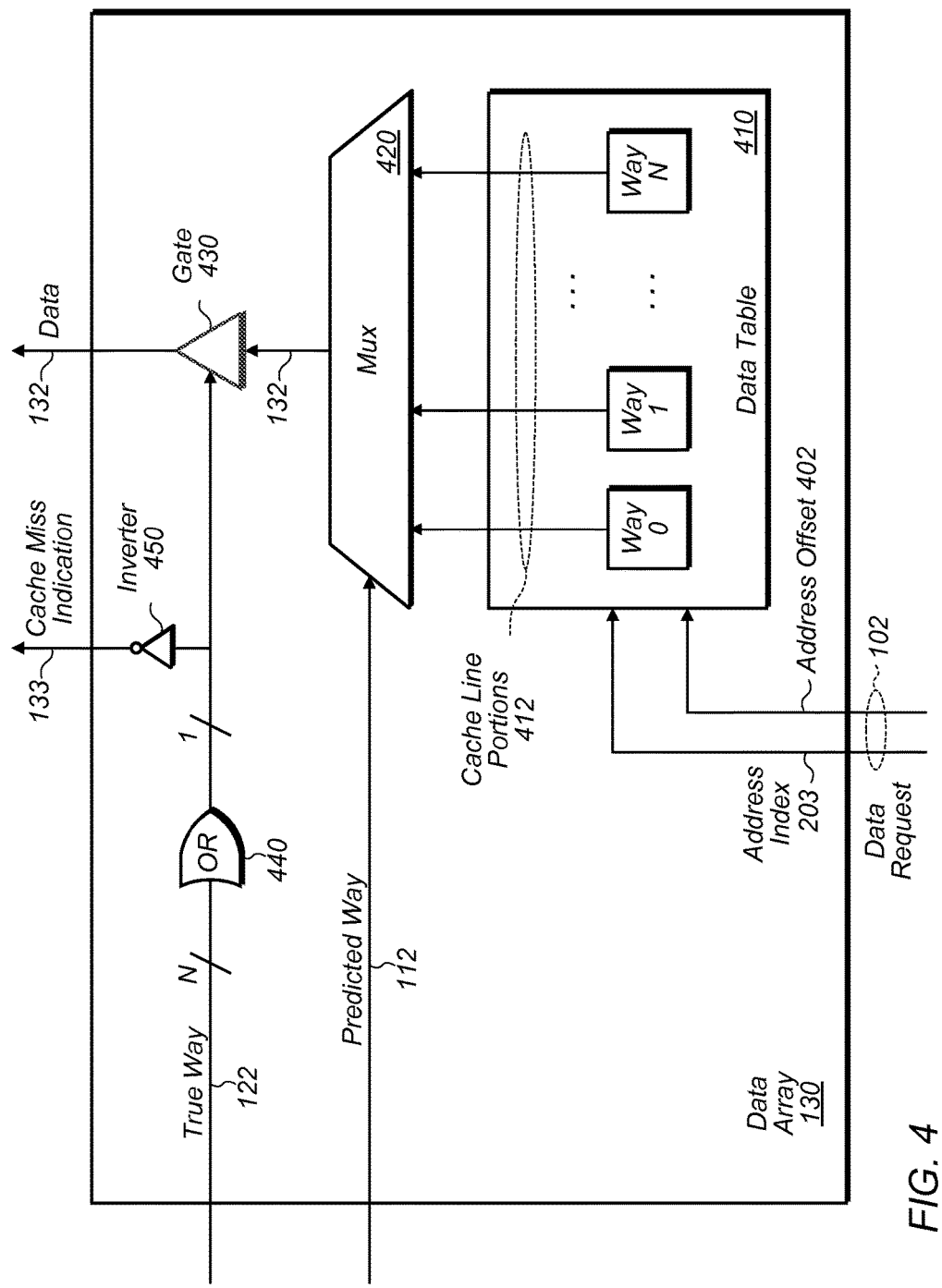
FIG. 4 is a block diagram illustrating one embodiment of data array within the cache.

Turning now to FIG. 4, a block diagram of one embodiment of data array 130 is depicted. As noted above, in various embodiments, data array 130 is configured to store the data maintained by cache 100. In the illustrated embodiment, data array 130 includes a data table 410, multiplexer (mux) 420, gate 430, OR gate 440, and inverter 450. In various embodiments, data array 130 may be implemented differently than shown. For example, in some embodiments, array 130 may not include elements 430-450.

Data table 410, in one embodiment, is memory configured to store a data block in one of multiple ways 1-N. This memory may include any of various forms of non-volatile memory such the examples given above with respect to FIG. 1. In various embodiments, data table 410 is configured to receive address index 203 (i.e., the same index 203 provided to way prediction circuit 110 and tag circuit 120) and an address offset 402 included in an address specified by data request 102, and to provide the corresponding cache line portions 412. For example, in a twelve-way cache embodiment, data table 410 may provide portions 412 from twelve cache lines as determined by address index 203 and address offset 402. In the illustrated embodiment, mux 420 is configured to then select the requested data 132 from the cache line portions 412 based on the received predicted way 112. In other embodiments, however, data 132 may be selected differently than shown.

In various embodiments, data array 130 is configured to receive predicted way 112, address index 203, and address offset 402 prior to receiving true way 122, so that data table 410 and mux 420 are able to begin the process of retrieving data 132 while true way 122 is being determined by tag circuit 120. In doing so, data array 130 is able to provide data 132 more quickly than if it waited until it received true way 122 to begin retrieving data 132. For example, when true way 122 is received, data table 410 may have already selected the appropriate cache line portion 412 based address index and offset 402 and may be providing the portion 412 to mux 420.

In various embodiments, data array 130 is configured to discontinue retrieval of a data block from data table 410 in response to the data block being retrieved using incorrect predicted way 112 (i.e., one that does not match the determined true way 122) in order to prevent the incorrect data 132 from being provided by cache 100. In the illustrated embodiment, data array 130 prevents the incorrect data 132 from being provided, by using gate 430 and OR gate 440. As noted above, in one embodiment, true way 122 may be conveyed by asserting one of N lines of an interconnect between tag circuit 120 and data array 130 (N corresponding to the number of possible ways). In the event that predicted way 112 and result 322 do not match, a true way 122 may be provided by not asserting any of the lines (e.g., driving a logical zero across the lines). In the illustrated embodiment, if any of the lines are asserted, OR gate 440 is configured to provide a logical one to gate 430 allowing data 132 to pass through to the requesting circuitry in IC 10. In this embodiment, if none of the lines are asserted, OR gate 440 is configured to provide a logical zero to gate 430 to prevent data 132 from being provided to the requesting circuitry. Inverter 450 may also provide a cache miss indication 133 specifying whether a data request misses or hits in cache 100 (in this embodiment, driving a logical one indicates a cache miss; driving a logical zero indicates a cache hit). It is noted that elements 430-450 are merely presented as one embodiment in which retrieval of data 132 is discontinued/prevented. In another embodiment, data array 130 may include a queue that is configured to store information for a data request 102 while true way 122 is being determined. In such an embodiment, the queue may be configured to store the retrieved data 132 along with the predicted way 112 used to retrieve the data 132. In one embodiment, when the true way 122 is later received, data array 130 is configured to compare the stored predicted way 112 with the received true way 122. If they match, in this embodiment, data array 130 is configured to allow the data 132 to leave the queue and be provided to the requesting circuit. Otherwise, data array 130 may invalidate the entry storing the data 132 in the queue.

Figure 5:
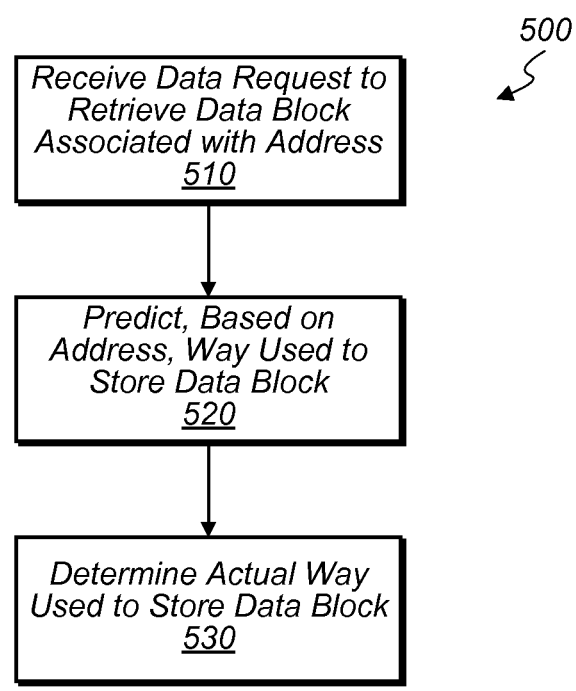
FIG. 5 is a flow diagram illustrating one embodiment of a method for using way prediction.

Turning now to FIG. 5, a flow diagram of a method 500 for retrieving a data block from a cache is depicted. Method 500 is one embodiment of method that may be performed by a computer system having a cache circuit such as cache 100. In some embodiments, performance of method 500 may reduce the number of cycles need to retrieve a data block associated with an address.

In step 510, a cache (e.g., cache 100) receives a data request (e.g., data request 102) to retrieve a data block associated with an address. In one embodiment, the cache provides the data request to a tag circuit (e.g., tag circuit 120) and a way prediction circuit (e.g., way prediction circuit 110).

In step 520, the cache predicts, based on the address, one of the ways (i.e. one of the locations) as being used to store the data block. In one embodiment, the cache computes a hash value (e.g., calculated hashed tag 222) based on two portions (e.g., address tag portions 202A and 202B) of a tag in the address. The cache, in this embodiment, retrieves, based on an index (e.g., address index 203) in the address, a set of hash values (e.g., stored hashed tags 212) associated with a set of locations. Accordingly, the cache compares the computed hash value with the set of hash values to predict one of the locations.

In step 530, the cache determines, based on a predicted way (e.g., 112) and a comparison of a tag portion of the address (e.g., address tag portion 202A) with a set of previously stored tag portions (e.g., tag portions 312) maintained by the cache, an true/actual way (e.g., true way 122) used to store the data block. In one embodiment, the cache determines that the predicted way differs from the actual way. Accordingly, the cache stops the retrieval of the data block and resends the data request through a pipeline of the cache to cause retrieval of a data block stored in the actual way.

Exemplary Computer System

Figure 6:
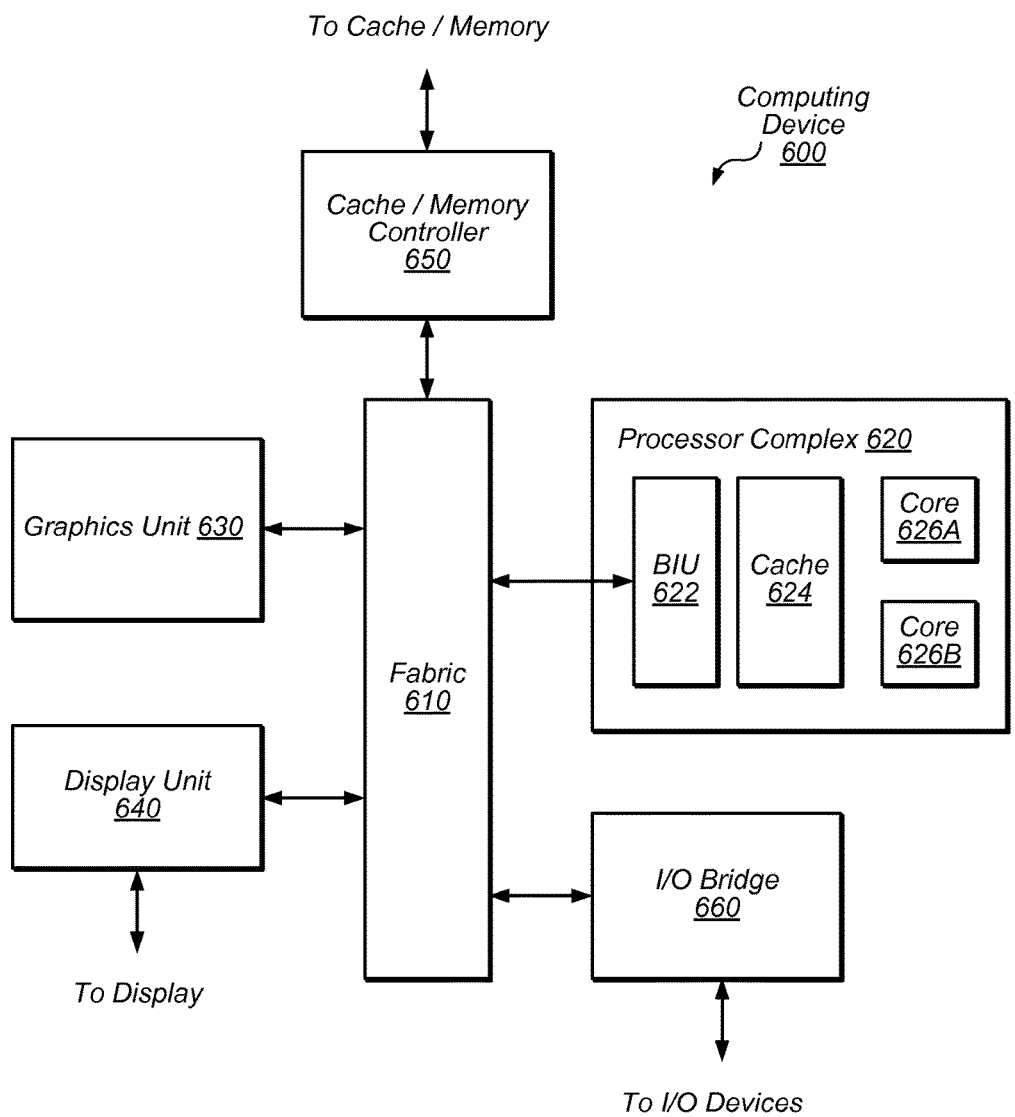
FIG. 6 is a block diagram illustrating one embodiment of an exemplary computer system.

Turning now to FIG. 6, a block diagram illustrating an exemplary embodiment of a device 600 is shown. Device 600 is one embodiment of a device that may include IC 10 described above. In some embodiments, elements of device 600 may be included within a system on a chip (SOC). In some embodiments, device 600 may be included in a mobile device, which may be battery-powered. Therefore, power consumption by device 600 may be an important design consideration. In the illustrated embodiment, device 600 includes fabric 610, processor complex 620, graphics unit 630, display unit 640, cache/memory controller 650, input/output (I/O) bridge 660.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally. As used herein, the term "coupled to" may indicate one or more connections between elements, and a coupling may include intervening elements. For example, in FIG. 6, graphics unit 630 may be described as "coupled to" a memory through fabric 610 and cache/memory controller 650. In contrast, in the illustrated embodiment of FIG. 6, graphics unit 630 is "directly coupled" to fabric 610 because there are no intervening elements.

In the illustrated embodiment, processor complex 620 includes bus interface unit (BIU) 622, cache 624, and cores 626A and 626B. In various embodiments, processor complex 620 may include various numbers of processors, processor cores, and/or caches. For example, processor complex 620 may include 1, 2, or 4 processor cores, or any other suitable number. In one embodiment, cache 624 is a set-associative L2 cache that corresponds to cache 100 described above. In some embodiments, cores 626A and/or 626B may include internal instruction and/or data caches. In some embodiments, a coherency unit (not shown) in fabric 610, cache 624, or elsewhere in device 600 may be configured to maintain coherency between various caches of device 600. BIU 622 may be configured to manage communication between processor complex 620 and other elements of device 600. Processor cores such as cores 626 may be configured to execute instructions of a particular instruction set architecture (ISA) which may include operating system instructions and user application instructions.

Graphics unit 630 may include one or more processors and/or one or more graphics processing units (GPU's). Graphics unit 630 may receive graphics-oriented instructions, such as OPENGL®, Metal, or DIRECT3D® instructions, for example. Graphics unit 630 may execute specialized GPU instructions or perform other operations based on the received graphics-oriented instructions. Graphics unit 630 may generally be configured to process large blocks of data in parallel and may build images in a frame buffer for output to a display. Graphics unit 630 may include transform, lighting, triangle, and/or rendering engines in one or more graphics processing pipelines. Graphics unit 630 may output pixel information for display images.

Display unit 640 may be configured to read data from a frame buffer and provide a stream of pixel values for display. Display unit 640 may be configured as a display pipeline in some embodiments. Additionally, display unit 640 may be configured to blend multiple frames to produce an output frame. Further, display unit 640 may include one or more interfaces (e.g., MIPI® or embedded display port (eDP)) for coupling to a user display (e.g., a touchscreen or an external display).

Cache/memory controller 650 may be configured to manage transfer of data between fabric 610 and one or more caches and/or memories. For example, cache/memory controller 650 may be coupled to an L3 cache, which may in turn be coupled to a system memory. In other embodiments, cache/memory controller 650 may be directly coupled to a memory. In some embodiments, cache/memory controller 650 may include one or more internal caches. Memory coupled to controller 650 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 650 may be any type of non-volatile memory such as NAND flash memory, NOR flash memory, nano RAM (NRAM), magneto-resistive RAM (MRAM), phase change RAM (PRAM), Racetrack memory, Memristor memory, etc.

I/O bridge 660 may include various elements configured to implement: universal serial bus (USB) communications, security, audio, and/or low-power always-on functionality, for example. I/O bridge 660 may also include interfaces such as pulse-width modulation (PWM), general-purpose input/ output (GPIO), serial peripheral interface (SPI), and/or inter-integrated circuit (I2C), for example. Various types of peripherals and devices may be coupled to device 600 via I/O bridge 660. For example, these devices may include various types of wireless communication (e.g., wifi, Bluetooth, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An integrated circuit, comprising:
   a memory device including a set-associative cache configured to receive a request for a data block stored in one of a plurality of ways within the cache, wherein the request specifies an address, a portion of which is a tag value;
   a way prediction circuit configured to:
      perform a first tag comparison using the tag value; and
      predict, based on the first tag comparison, a way in which the requested data block is stored; and
   a tag array circuit configured to:
      perform a second tag comparison by comparing a portion of the tag value with a set of previously stored tag portions corresponding to the plurality of ways; and
      determine whether the request hits in the cache based on the predicted way and an output of the second tag comparison.

2. The integrated circuit of claim 1, wherein the way prediction circuit is configured to perform the first tag comparison by:
   calculating a current hash value from the tag value;
   retrieving a set of previously stored hash values, each associated with a respective one of the plurality of ways; and
   comparing the current hash value with the set of previously stored hash values wherein the way prediction circuit is configured to, in response to the current hash value matching one of the set of previously stored hash values, predict the way in which the requested data block is stored.

3. The integrated circuit of claim 2, wherein the way prediction circuit is configured to calculate the current hash value by performing an exclusive-OR operation between a first portion of the tag value and a second portion of the tag value.

4. The integrated circuit of claim 3, wherein a tag portion in the set of previously stored tag portions is half of the bits in a tag value included in an address for a data block stored in one of the plurality of ways.

5. The integrated circuit of claim 2, wherein the way prediction circuit is further configured to predict the way by verifying that hash values in the set of previously stored hash values are valid.

6. The integrated circuit of claim 1, wherein the tag array circuit is configured to determine whether the request hits in the cache by:
   determining that the portion of the tag value matches a tag portion in a set of previously stored tag portions;
   comparing the predicted way with a way associated with the matching tag portion in the set of previously stored tag portions; and
   determining that the request hits in the cache in response to the predicted way matching the way associated with the matching tag portion.

7. The integrated circuit of claim 1, wherein the way prediction circuit is configured to provide the predicted way to a data array in the cache to cause retrieval of a data block stored in the predicted way; and
   wherein the tag array circuit is configured to determine an actual way in which the requested data block is stored.

8. The integrated circuit of claim 7, wherein the cache is configured to:
   determine whether the actual way differs from the predicted way; and
   in response to determining that actual way differs from the predicted way, discontinue the retrieval of the data block stored in the predicted way.

9. The integrated circuit of claim 8, wherein the cache is configured to:
   in response to determining that actual way differs from the predicted way:
      invalidate a selected hash value in the way prediction circuit that caused the way prediction circuit to predict the predicted way; and
      insert a new hash value in the way prediction circuit.

10. The integrated circuit of claim 9, wherein the cache is configured to:
    replay the request for the data block, wherein replaying the request includes the way prediction circuit using the inserted hash value to predict the actual way in which the requested data block is stored.

11. The integrated circuit of claim 1, wherein the cache is configured to:
    receive, from memory, a data block associated with another address that caused a cache miss, wherein the other address includes another tag value;
    store the received data block in one of a plurality of ways within the cache;
    store, in the way prediction circuit, a hash value calculated based on the other tag value; and
    store, in the tag array circuit, a portion of the other tag value.

12. The integrated circuit of claim 11, wherein the cache is configured to:
    determine that the stored hash value matches an existing hash value in the way prediction circuit; and
    invalidate the existing hash value in response to the stored hash value matching the existing hash value.

13. An integrated circuit, comprising:
a memory device having an N-way set-associative cache configured to receive a request for a set of data stored in one of N locations, wherein the request specifies an address including a tag value and an index value; and
a prediction circuit configured to:
use the index value to retrieve a set of stored hash values;
perform a first comparison of the set of stored hash values with a hash value computed based on the tag value; and
based on the first comparison, predict which one of the N locations stores the set of data;
a tag circuit configured to:
perform a second comparison of a portion of the tag value with a set of previously computed tag portions maintained by the tag circuit; and
determine, based on the second comparison and the predicted location, an actual location that stores the set of data.

14. The integrated circuit of claim 13, wherein the prediction circuit is configured to provide the predicted location to a data array in the cache before the tag circuit determines the actual location.

15. The integrated circuit of claim 13, wherein the cache is configured to resend the request through a pipeline that includes the prediction circuit and the tag circuit in response to the actual location differing from the predicted location.

16. The integrated circuit of claim 13, wherein the prediction circuit is configured to compute the hash value by performing an exclusive-OR operation using two or more portions of the tag value.

* * * * *